3,502,708
PREPARATION OF BETA-MERCAPTO-PROPIONITRILE

Jozef A. Thoma, Vaals, and Joseph A. M. J. Coonen, Geleen, Netherlands, assignors to Stamicarbon N.V., Heerlen, Netherlands
No Drawing. Filed June 20, 1966, Ser. No. 558,572
Claims priority, application Netherlands, July 3, 1965, 6508595
Int. Cl. C07c 121/02, 121/14
U.S. Cl. 260—465.1     4 Claims

ABSTRACT OF THE DISCLOSURE

A process is described for the preparation of beta-mercaptopropionitrile wherein acrylonitrile is reacted with a molar excess of liquid hydrogen sulfide in the presence of an organic nitrogen base at temperatures between about −10 to 50° C. whereby the desired product is obtained in high yields. The further step of neutralizing the specific catalyst at the conclusion of the reaction by the addition of an acid is also described.

---

The present invention relates to the preparation of beta-mercaptopropionitrile, which compound can be hydrolyzed to form beta-mercaptopropionic acid, an acid which is used commercially as an antioxidant in artificial fibers and other high molecular weight polymers.

According to a known method of preparation, beta-mercaptopropionitrile is obtained by adding acrylonitrile to hydrogen sulphide at a temperature below about 75° C., upon which addition a slow exothermic non-catalytic reaction takes place. However, the efficiency of this process is low, affording a yield of less than 40%.

According to the present invention, the reaction of acrylonitrile with hydrogen sulphide is carried out in a different manner, as a result of which high yields of beta-mercaptopropionitrile are obtained.

The process of the present invention prepares beta-mercaptopropionitrile by reaction of acrylonitrile with liquid hydrogen sulphide, in the presence of an organic base.

The amount of the organic base, used as a catalyst in this reaction, may be small. An amount of about 0.01–0.1 mole of the base per mole of acrylonitrile is adequate and all that is required. The use of larger amounts of the catalyst is unnecessary, and merely renders the processing of the reaction product difficult.

Examples of suitable organic bases are secondary and tertiary aliphatic amines, such as triethyl amine or diethyl amine (e.g., secondary and tertiary lower alkyl amines), aliphatic diamines, for instance tetramethylene diamine, and also heterocyclic amines such as piperidine, and quaternary ammonium bases, for instance trimethyl benzyl ammonium hydroxide.

The amount of hydrogen sulphide theoretically required for the reaction is one mole per mole of acrylonitrile. Higher yields are obtained, however, with an excess amount of hydrogen sulphide, preferably about 5 to 15 moles per mole of acrylonitrile.

The temperature at which the reaction is carried out may be varied. Most suitably, a temperature of about −10 to 50° C. is used, in which range the hydrogen sulphide can easily be kept in the liquid state by applying a low super-atmospheric pressure of about 5 to 25 atm., and only simple apparatus need be used. In taking measures to maintain the reaction temperature, account should be taken of the fact that the reaction is exothermic.

If desired, the reaction can also be carried out in a solvent, e.g., a hydrocarbon, such as benzene and toluene, or in an alcohol, sauch as ethanol.

When, after a few minutes, the rapid reaction has stopped, the excess hydrogen sulphide can then be removed by evaporation. The catalyst can be conveniently chemically bound up by addition of an acid to form the amine salt. In this connection, it has been found preferable, immediately after the reaction has stopped, first to carry out an acidification in the presence of the (unremoved) hydrogen sulphide, and next to remove the hydrogen sulphide. In this way it is possible to prevent undesirable polymerization of the beta-mercaptopropionitrile, which polymerization tends to be promoted by the catalyst.

After the hydrogen sulphide has been removed, the reaction product can be processed further and recovered by conventional methods, e.g., by distillation. To prevent polymerization, the beta-mercaptopropionitrile that has been separated off may be stabilized by means of a very slight amount of an acid, e.g., hydrochloric acid.

The practice of this invention is further allustrated by the following examples, but the process is not, of course, confined to these specific embodiments.

EXAMPLE I

In an autoclave having a volume of ¾ litre, 160 g. of liquid hydrogen sulphide (4.7 moles) and 3 g. triethyl amine (0.03 mole) are mixed with 200 ml. of benzene. The temperature is 15° C. and the pressure 15 atm.

Thereafter, 30 ml. of acrylonitrile (0.46 mole) is added, upon which addition the temperature rises to 21° C. Next, 4 g. of acetic acid is added, and the excess hydrogen sulphide is removed by evaporation.

Upon distillation the reaction product yields 37 g. of beta-mercaptopropionitrile (boiling point 40° C. at 2.5 mm. Hg), which corresponds to a yield of 92%.

EXAMPLE II

In an autoclave having a volume of ¾ litre, 10 g. of trimethyl benzyl ammonium hydroxide (0.06 mole) is added to 301 g. of liquid hydrogen sulphide (8.8 moles). The temperature is 10° C. and the pressure 17 atm.

Thereafter, 60.2 ml. of acrylonitrile (0.9 mole) is introduced under pressure into the autoclave, during which introduction the temperature rises to 32° C.

After addition of 5 ml. of acetic acid and 2 ml. of concentrated hydrochloric acid, the hydrogen sulphide is removed by evaporation, and the reaction product is distilled.

The yield is 70.7 g. of beta-mercaptopropionitrile or 89.5% based on the acrylonitrile.

What is claimed is:

1. In a catalytic process for preparing beta-mercaptopropionitrile by reacting acrylonitrile with hydrogen sulfide the improvement which comprises carrying out the reaction in the presence of a catalyst consisting essentially of a catalytic amount of a base selected from the group consisting of secondary and tertiary aliphatic amines, aliphatic diamines, heterocyclic amines and an aliphatic quaternary ammonium base, and conducting the said reaction under a pressure sufficient to maintain a molar excess of liquid hydrogen sulfide at a temperature of between about −10 to 50° C., whereby said beta-mercaptopropionitrile is formed.

2. A process according to claim 1, wherein a required amount of about 0.01 to 0.1 mole of the base is used per mole of acrylonitrile.

3. A process according to claim 1, wherein an amount of about 5 to 15 moles of hydrogen sulphide is used per mole of acrylonitrile.

4. A process according to claim 1, wherein after the reaction between acrylonitrile and hydrogen sulphide is essentially complete, the reaction mixture is acidified in the presence of hydrogen sulphide.

References Cited

UNITED STATES PATENTS

| | | | |
|---|---|---|---|
| 2,163,176 | 6/1939 | Keyssner | 260—465.1 XR |
| 2,579,580 | 12/1951 | Howk et al. | 260—465.1 |
| 2,748,155 | 5/1956 | Wordie | 260—465.1 |
| 3,278,574 | 10/1966 | Louthan | 260—465.1 |
| 3,280,163 | 10/1966 | Louthan et al. | 260—465.1 |
| 3,328,459 | 6/1967 | Louthan | 260—465.1 XR |

OTHER REFERENCES

Wagner and Zook, Synthetic Organic Chemistry, 1953, John Wiley & Sons, New York, p. 412.

Gershbein et al., J.A.C.S., 69, pp. 241–242 (1947).

JOSEPH P. BRUST, Primary Examiner

U.S. Cl. X.R.

260—526